(12) United States Patent
Hara

(10) Patent No.: US 9,910,546 B2
(45) Date of Patent: Mar. 6, 2018

(54) POSITION DETECTING DEVICE

(71) Applicant: Wacom Co., Ltd., Saitama (JP)

(72) Inventor: Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 78 days.

(21) Appl. No.: 14/627,970

(22) Filed: Feb. 20, 2015

(65) Prior Publication Data

US 2015/0317009 A1    Nov. 5, 2015

(30) Foreign Application Priority Data

Apr. 30, 2014  (JP) .................................. 2014-093281

(51) Int. Cl.
*G06F 3/045* (2006.01)
*G06F 3/044* (2006.01)
(Continued)

(52) U.S. Cl.
CPC ............... *G06F 3/044* (2013.01); *G01D 5/24* (2013.01); *G01D 9/10* (2013.01); *G06F 3/0416* (2013.01);
(Continued)

(58) Field of Classification Search
CPC ...... G06F 3/044; G06F 3/0418; G06F 3/0416; G06F 3/0488; G06F 2203/04111; G01D 5/24; G01D 9/10
See application file for complete search history.

(56) References Cited

U.S. PATENT DOCUMENTS

| 8,199,132 B1 * | 6/2012 | Oda ..................... G06F 3/03545 178/19.03 |
| 2007/0229468 A1* | 10/2007 | Peng ....................... G06F 3/044 345/173 |
| 2008/0012835 A1* | 1/2008 | Rimon .................... G06F 3/038 345/173 |

(Continued)

FOREIGN PATENT DOCUMENTS

| EP | 2 579 132 A2 | 4/2013 |
| EP | 2 660 688 A1 | 11/2013 |

(Continued)

OTHER PUBLICATIONS

Extended European Search Report dated Oct. 13, 2015, for corresponding EP Application No. 15165057.9-1507, 11 pages.

*Primary Examiner* — Ilana Spar
*Assistant Examiner* — Brent D Castiaux
(74) *Attorney, Agent, or Firm* — Seed IP Law Group LLP

(57) ABSTRACT

The invention allows size reduction of a sensor of a position detecting device of a capacitive system, which detects a position indicated by an indicator. The sensor has plural electrode conductors that are disposed adjacent to each other and are configured to receive a signal from the indicator on a first surface of a substrate having the first surface and a second surface opposed to each other. The position detecting device includes a signal processing circuit including a differential amplifier circuit that calculates a difference between signals from at least two of the plural electrode conductors. Plural connecting lines are formed on the second surface of the substrate. The plural connecting lines each have one end connected to one of the plural electrode conductors disposed on the first surface by a through-hole or a via formed through the substrate, and the other end connected to a line-concentrated part.

18 Claims, 10 Drawing Sheets

(51) Int. Cl.
 *G01D 9/10* (2006.01)
 *G01D 5/24* (2006.01)
 *G06F 3/0488* (2013.01)
 *G06F 3/041* (2006.01)

(52) U.S. Cl.
 CPC .......... *G06F 3/0418* (2013.01); *G06F 3/0488* (2013.01); *G06F 2203/04111* (2013.01)

(56) References Cited

U.S. PATENT DOCUMENTS

| | | |
|---|---|---|
| 2010/0155153 A1 | 6/2010 | Zachut |
| 2010/0214247 A1 | 8/2010 | Tang et al. |
| 2011/0298747 A1 | 12/2011 | Kim et al. |
| 2012/0062499 A1* | 3/2012 | Weaver ............... G06F 3/03545 345/174 |
| 2012/0169631 A1 | 7/2012 | Ahn |
| 2013/0257786 A1* | 10/2013 | Brown .................... G06F 3/044 345/174 |
| 2013/0319137 A1* | 12/2013 | Grau ....................... G06F 3/005 73/862.381 |
| 2014/0028626 A1 | 1/2014 | Maeda et al. |
| 2014/0078101 A1* | 3/2014 | Katsurahira ............ G06F 3/044 345/174 |
| 2014/0152602 A1* | 6/2014 | Miyamoto ............ G06F 3/0416 345/173 |

FOREIGN PATENT DOCUMENTS

| | | |
|---|---|---|
| JP | 5006153 A | 1/1993 |
| JP | 08179871 A | 7/1996 |
| JP | 10020992 A | 1/1998 |

\* cited by examiner

FIG. 7A  A-A CROSS-SECTION DIAGRAM
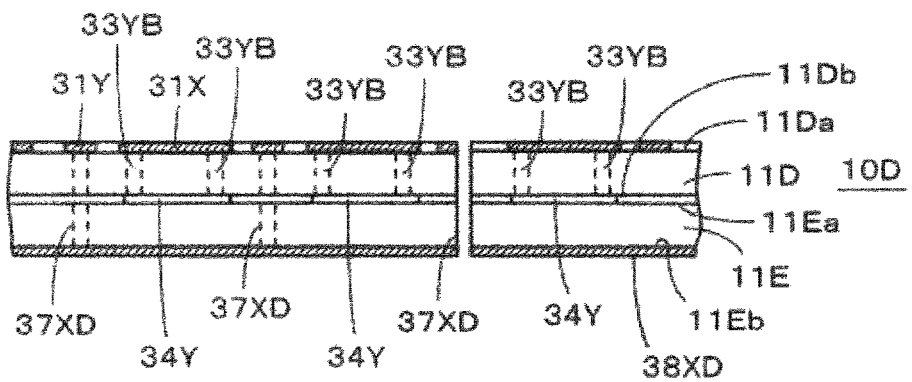
FIG. 7B
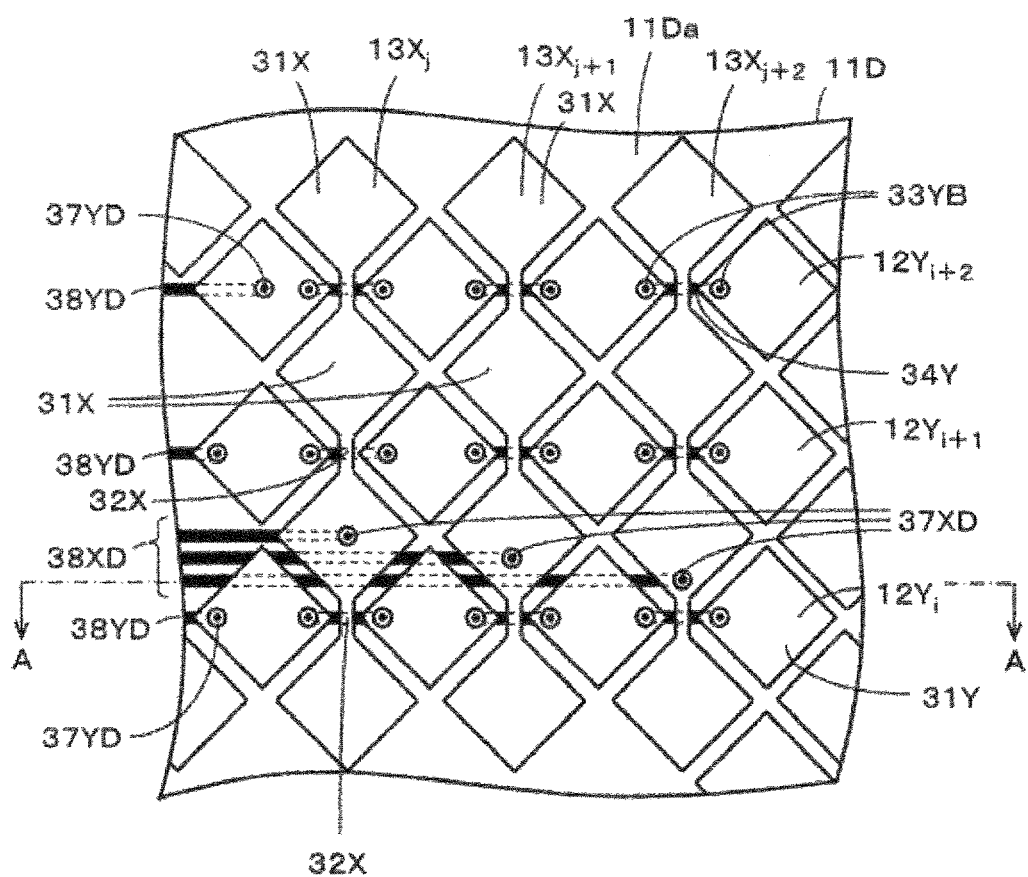

POSITION DETECTING DEVICE

BACKGROUND

Technical Field

This invention relates to a position detecting device of a capacitive system that detects a position indicated by a position indicator by receiving a signal from the position indicator.

Description of the Related Art

Tablet information terminals equipped with touch panels are commonly used. For example, the electrostatic induction system disclosed in Patent Document 1 (Japanese Patent Laid-Open No. Hei 08-179871) is widely used. In Patent Document 1, plural electrode conductors are disposed vertically and horizontally on a substrate surface of a position detecting sensor. The intersections formed by these electrode conductors are sequentially selected and the signal intensity is obtained. Based on the signal distribution, a position indicated by, for example, a position indicator, such as a pen type position indicator (hereinafter, referred to as an indicating pen), is obtained.

In Patent Document 1, the indicating pen internally includes an oscillator circuit. An oscillation signal with a predetermined frequency from the oscillator circuit is applied to the plural electrode conductors of the position detecting sensor. Furthermore, in the position detecting device, the position indicated by the indicating pen on the input surface of the position detecting sensor is detected from the signal intensity (signal level) of an induced signal obtained from each of the electrode conductors disposed vertically and horizontally.

The above-described device is frequently used in combination with a display device, such as a liquid crystal display (LCD). In this case, noise generated by the display device gets mixed in with the signal such that the position of the indicator cannot be correctly obtained or an incorrect position is detected. This results in erroneous operation in some cases. As such, denoising is an important issue for a position detecting device of an electrostatic induction system.

A differential amplifier circuit is often used in related arts for denoising. Specifically, two electrode lines disposed along the same direction are simultaneously selected. One of the electrodes is connected to the positive-side input of the differential amplifier circuit and the other electrode is connected to the negative-side input of the differential amplifier circuit. Therefore, the noise component is canceled and only a signal difference generated by the indicator, such as an indicating pen, is detected. Examples of this method include techniques described in Patent Document 2 (Japanese Patent Laid-Open No. Hei 5-6153) and Patent Document 3 (Japanese Patent Laid-Open No. Hei 10-20992).

For a position detecting sensor of the related arts, the above-described plural electrode conductors are provided by forming conductor patterns as shown in FIG. 11 on a substrate 1 composed of, for example, resin.

Specifically, in FIG. 11, formed on the substrate 1 with, for example, a rectangular shape are plural first electrode conductors (hereinafter, referred to as Y-electrode conductors) $Y_1, Y_2, \ldots, Y_m$ (m is an integer equal to or larger than two) extending along a horizontal direction (X-axis direction), and plural second electrode conductors (hereinafter, referred to as X-electrode conductors) $X_1, X_2, \ldots, X_n$ (n is an integer equal to or larger than two) extending along a direction intersecting the horizontal direction, specifically a vertical direction (Y-axis direction) orthogonal to the horizontal direction. In this case, an area in which the intersections of the plural Y-electrode conductors $Y_1$ to $Y_m$ and the plural X-electrode conductors $X_1$ to $X_n$ are formed (area surrounded by a dotted line 2s in FIG. 11) serves as a detection area 2 for an indicator.

Furthermore, as shown in FIG. 11, the substrate 1 includes, as projecting parts, a Y-electrode terminal 3 and an X-electrode terminal 4 forming connection terminals with an external signal processing circuit. In the Y-electrode terminal 3, conductor patterns extended from each of the plural Y-electrode conductors $Y_1$ to $Y_m$ are concentrated by being routed along the periphery of the substrate 1. Similarly, in the X-electrode terminal 4, conductor patterns extended from each of the plural X-electrode conductors $X_1$ to $X_n$ are concentrated by being routed along the periphery of the substrate 1.

As described above, in the related-art position detecting sensor, lead conductor patterns formed by being extended from the respective electrode conductors need to be routed around along the periphery of the substrate 1 to thereby concentrate the plural Y-electrode conductors $Y_1$ to $Y_m$ and the plural X-electrode conductors $X_1$ to $X_n$ in the Y-electrode terminal 3 and the X-electrode terminal 4, respectively. Thus, an interconnect area 5 (indicated by the hatched lines in FIG. 11) for the lead conductor patterns (connecting lines), surrounded by the dotted line 5s, needs to be provided in FIG. 11.

Accordingly, the related arts have a problem that the substrate 1 is larger than the detection area 2 for the indicator because of the existence of the interconnect area 5. This results in lower convenience and design property.

In related arts, in the case of a position detecting device of an electromagnetic induction system in which X-direction and Y-direction loop coils are formed in a position detecting sensor and used, an attempt to eliminate the interconnect area 5 of the connecting lines is made by forming the connecting lines on the back surface side (side on which the loop coils are not formed) of the substrate by using through-holes. This is allowed because, in the case of the electromagnetic induction system, components that receive a signal from an indicating pen are the loop coils and it is difficult for the connecting lines to receive the signal from the indicating pen.

However, in the case of a position detecting sensor of a capacitive system, the connecting lines also receive the signal from the indicating pen. Therefore, there is a problem that it is difficult to detect the position of the indicator if the connecting lines are formed on the back surface side (side on which the X-electrode conductors and Y-electrode conductors are not formed) of the substrate by simply using through-holes.

For a position detecting sensor of a capacitive system, a differential amplifier circuit, which performs differential amplification of received signals from two electrode conductors on which similar noise is superimposed, is used to remove noise that is generated in the sensor from the received signals obtained from the electrode conductors. It is preferable that the distance between the two electrode conductors, each connected to a respective one of the non-inverting input terminal and the inverting input terminal of the differential amplifier circuit, are as short as possible. If there is a large distance between the two electrode conductors the similarity of noise is lost and the effect of the enhancement in the noise resistance obtained by the differential amplification cannot be achieved. The circuit scale also becomes large.

BRIEF SUMMARY

It is desirable to provide a position detecting device of a capacitive system that can solve the above-described problems.

To solve the above-described problems, one aspect of the invention provides a position detecting device of a capacitive system that detects a position indicated by an indicator according to a signal transmitted from the indicator. The position detecting device includes a substrate having a first surface and a second surface opposed to the first surface, a plurality of electrode conductors that are disposed adjacent to each other on the first surface of the substrate and configured to receive the signal transmitted from the indicator, and a signal processing circuit including a differential amplifier circuit configured to calculate a difference between at least two electrode conductors selected from the plurality of electrode conductors. The signal processing circuit detects the position indicated by the indicator from an output of the differential amplifier circuit. The position detecting device further includes a plurality of connecting lines that are disposed close to each other on the second surface of the substrate. Each of the connecting lines has one end connected to a respective one of the plurality of electrode conductors disposed on the first surface by a through-hole or a via, and a line-concentrated part that is connected to the other end of the respective one of the plurality of connecting lines and that serves as a connection terminal with the signal processing circuit. Furthermore, connecting parts, which are provided to electrically connect conductor patterns via through-holes formed in the substrate to thereby form an electrode conductor among the plurality of electrode conductors, are arranged so as to extend along a direction that is not orthogonal to the connecting lines (e.g., the connecting parts extend in parallel with the connecting lines).

In the aspect of the invention having the above-described configuration, the plural electrode conductors are formed adjacent to each other on the first surface of the substrate. In addition, the connecting lines for connecting the plural electrode conductors to the signal processing circuit are disposed close to each other on the second surface of the substrate that is opposite to the first surface of the substrate in which the plural electrode conductors are formed.

Therefore, the connecting lines are electrostatically shielded by the plural electrode conductors, and reception of a transmitted signal from the indicator, such as an indicating pen, by the connecting lines is prevented or alleviated. Furthermore, the connecting lines are disposed close to each other. Moreover, the connecting parts for electrically connecting the conductor patterns via the through-holes formed in the substrate to thereby form an electrode conductor among the plural electrode conductors are so formed as to extend along a direction that is not orthogonal to the connecting lines. Thus, the connecting lines are disposed close to each other even at the part where the above-described connecting parts exist.

Accordingly, even when noise is superimposed on the connecting lines, the noise is in a similar state in the plural connecting lines. Thus, the noise superimposed on the connecting lines is removed by performing a difference calculation on signals from the plural electrode conductors in the differential amplifier circuit of the signal processing circuit.

For the above reasons, according to the above-described aspect of the invention, in a position detecting device of a capacitive system, the position indicated by the indicator can be correctly detected when the connecting lines are provided on the second surface of the substrate that is opposite to the first surface of the substrate on which the plural electrode conductors are formed.

In one preferred mode of the position detecting device of the above-described aspect of the invention, each of the plurality of electrode conductors are formed to extend along a first direction and are arranged close to each other in a second direction that intersects the first direction. Furthermore, the plural connecting lines are formed to extend along the second direction.

According to the preferred mode, the plural connecting lines for the plural electrode conductors, which are connected by the through-holes, are formed to extend along the second direction that intersects the first direction, along which the plural electrode conductors extend. In the case of forming the connecting lines along the first direction, which is the extension direction of the plural electrode conductors, the connecting lines need to be formed across the whole surface in the second direction, which is the arrangement direction of the plural electrode conductors. However, in the preferred mode, the forming direction of the connecting lines is in the second direction that intersects the first direction, along which the plural electrode conductors extend. Therefore, in the preferred mode, the positions of the through-holes can be made close to each other in the second direction in the plural electrode conductors. Therefore, it is easy to form the connecting lines close to each other in parallel.

As a result, according to the above-described preferred mode, for a position detecting device of a capacitive system, the position indicated by the indicator can be correctly detected with alleviation of noise when the connecting lines are provided opposed to the plural electrode conductors on the second surface on the opposite side to the first surface of the substrate on which the plural electrode conductors are formed, in the position detecting sensor.

According to the invention, in the position detecting device of the capacitive system, the connecting lines can be provided on the second surface of the substrate that is opposite to the first surface of the substrate on which the plural electrode conductors are formed, while ensuring of correct detection of the position indicated by the indicator. As such, the connecting lines formed on the second surface of the substrate do not need to be led around to the peripheral part of the substrate. This can eliminate an interconnect area in which the connecting lines are led around and correspondingly reduce the size of the substrate, which can prevent the lowering of convenience and design property.

BRIEF DESCRIPTION OF THE SEVERAL VIEWS OF THE DRAWINGS

FIGS. 7A and 7B are diagrams for explaining one example of a sensor used for a position detecting device according to a third embodiment of the invention;

DETAILED DESCRIPTION

First Embodiment

Figure 1:
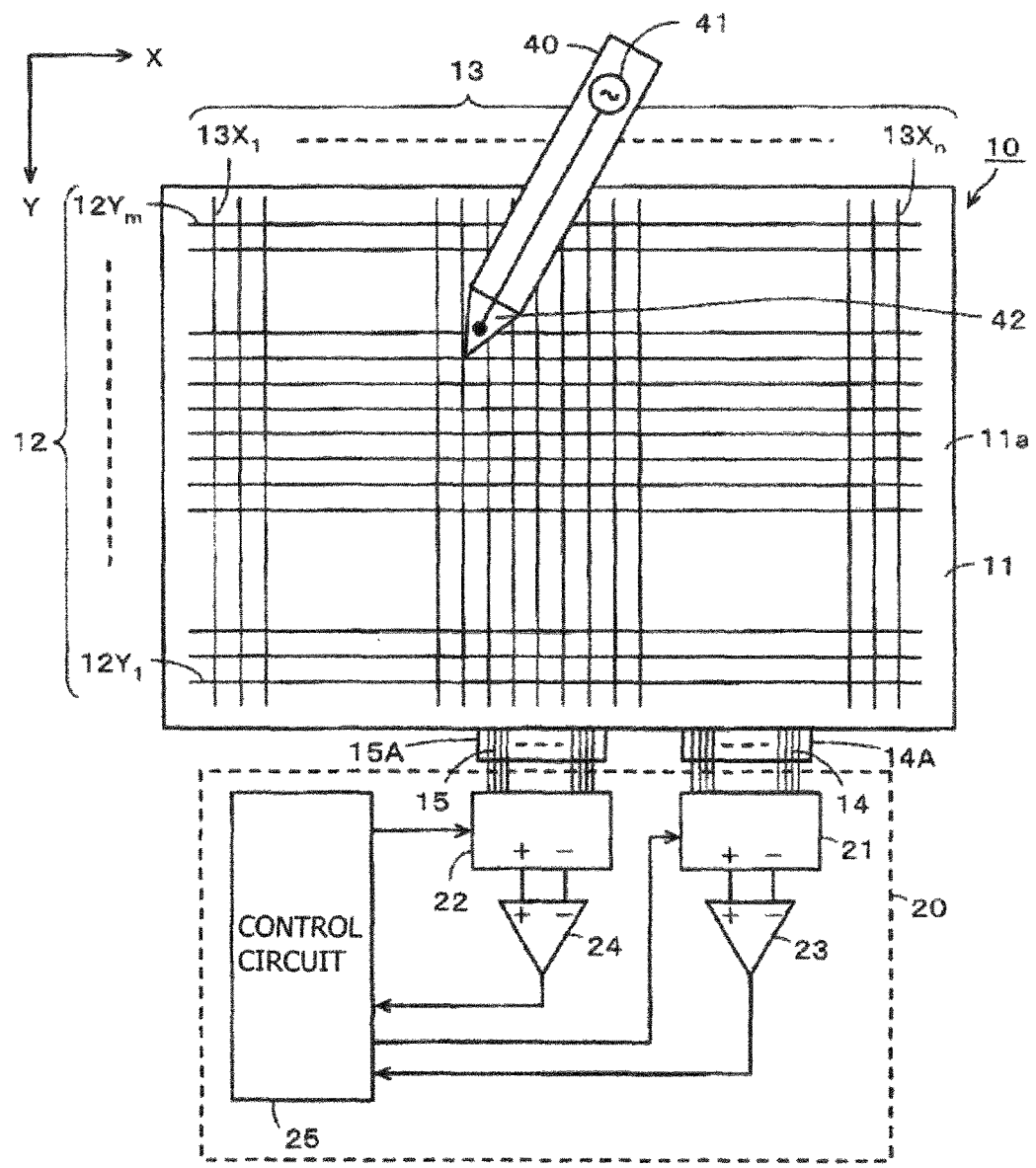
FIG. 1 is a diagram for explaining an overall outline of position detecting devices according to embodiments of the invention.

FIG. 1 is a diagram showing a schematic configuration of a position detecting device according to a first embodiment of the invention. In FIG. 1, the position detecting device has a position detecting sensor 10 (hereinafter, abbreviated as the sensor for simplification) and a signal processing circuit 20 for detecting a position indicated by an indicating pen 40 based on a signal received by the sensor 10.

The sensor 10 includes a first electrode conductor group 12 and a second electrode conductor group 13 on a substrate 11 composed of, for example, resin. In this example, the substrate 11 is a flat plate having a rectangular shape and has a front surface 11a as a first surface and a back surface 11b (see FIG. 3) as a second surface opposed to each other.

The first electrode conductor group 12 is obtained by juxtaposing plural first electrode conductors $12Y_1$, $12Y, \ldots, 12Y_m$, extending along the horizontal direction (X-axis direction) and separated by predetermined intervals such that they are not electrically connected to each other. The second electrode conductor group 13 is obtained by juxtaposing plural second electrode conductors $13X_1$, $13X_2, \ldots, 13X_n$, extending along a direction that intersects the first electrode conductors $12Y_1$ to $12Y_m$ (the vertical direction (Y-axis direction) orthogonal to the first electrode conductors $12Y_1$ to $12Y_m$ in this example) and separated by predetermined intervals.

The first electrode conductors $12Y_1$ to $12Y_m$ and the second electrode conductors $13X_1$ to $13X_n$ are both formed on the front surface 11a of the substrate 11. In the first embodiment, as will be described later, all of the first electrode conductors $12Y_1$ to $12Y_m$, including the intersecting parts (see 32Y in FIG. 4) with the second electrode conductors $13X_1$ to $13X_n$, are formed on the front surface 11a of the substrate 11. On the other hand, for the second electrode conductors $13X_1$ to $13X_n$, the intersecting parts (see 34X in FIG. 4) with the first electrode conductors $12Y_1$ to $12Y_m$ are electrically connected, via through holes, on the side of the back surface 11b of the substrate 11.

Furthermore, in the first embodiment, projecting parts 14A and 15A, which form a line-concentrated part 14 for the second electrode conductor group 13 and a line-concentrated part 15 for the first electrode conductor group 12, respectively, are formed on one end side of the rectangular substrate 11 in the Y-axis direction. The projecting parts 14A and 15A, at which the line-concentrated parts 14 and 15 are formed, serve as connectors for connecting to the signal processing circuit 20.

The line-concentrated part 14 for the second electrode conductor group 13 is provided on the side of the front surface 11a of the substrate 11 and the line-concentrated part 15 for the first electrode conductor group 12 is provided on the back surface side of the substrate 11. Furthermore, the line-concentrated part 15 for the first electrode conductor group 12 is electrically connected to each of the first electrode conductors $12Y_1$ to $12Y_m$ via the through-holes.

As described above, the position detecting device of the first embodiment forms a position detecting device of a capacitive system that includes the sensor in which the first electrode conductor group 12 and the second electrode conductor group 13 are so disposed that the extension direction of the first electrode conductor group 12 is orthogonal to the extension direction of the second electrode conductor group 13. Furthermore, the position detecting device detects a position indicated by the indicating pen 40 based on change in the capacitance at the intersections of the first electrode conductors $12Y_1$ to $12Y_m$ and the second electrode conductors $13X_1$ to $13X_n$.

The indicating pen 40 internally includes an oscillator circuit 41. The oscillator circuit 41 is a circuit for generating a signal with a frequency of, for example, 1.8 MHz. The indicating pen 40 transmits the signal generated by the oscillator circuit 41 from a pen tip part 42 externally. The sensor 10 receives the signals transmitted from the indicating pen 40 by the first electrode conductor group 12 and the second electrode conductor group 13. Then, the signals received by the first electrode conductor group 12 and the second electrode conductor group 13 are each supplied to the signal processing circuit 20.

The signal processing circuit 20 is a circuit for executing predetermined signal processing on the signal received by the sensor 10. The signal processing circuit 20 includes selecting circuits 21 and 22, differential amplifier circuits 23 and 24, and a control circuit 25.

The signals received by the sensor 10 are inputted in to the control circuit 25 via the selecting circuits 21 and 22 and the differential amplifier circuits 23 and 24 in the signal processing circuit 20. The control circuit 25 checks the level of the received signals at the respective electrode conductors $12Y_1$ to $12Y_m$ of the first electrode conductor group 12 and the respective electrode conductors $13X_1$ to $13X_n$ of the second electrode conductor group 13, and detects that the indicating pen 40 exists over an electrode conductor where the level of the 1.8-MHz signal is a high level.

Each of the first electrode conductors $12Y_1$ to $12Y_m$ is connected to the selecting circuit 22 via the line-concentrated part 15. Similarly, each of the second electrode conductors $13X_1$ to $13X_n$ is connected to the selecting circuit 21 via the line-concentrated part 14. The selecting circuit 21 and the selecting circuit 22 are connected to the differential amplifier circuits 23 and 24, respectively.

The selecting circuit 21 includes, for example, a microprocessor. The selecting circuit 21 selects an electrode conductor to be connected to the positive-side input terminal (non-inverting input terminal) of the differential amplifier circuit 23 and an electrode conductor to be connected to the negative-side input terminal (inverting input terminal) of the differential amplifier circuit 23 among the second electrode conductors $13X_1$ to $13X_n$ in response to selection control from the control circuit 25. Similarly, the selecting circuit 22 selects an electrode conductor to be connected to the positive-side input terminal of the differential amplifier circuit 24 and an electrode conductor to be connected to the negative-side input terminal of the differential amplifier circuit 24 among the first electrode conductors $12Y_1$ to $12Y_m$ in response to selection control from the control circuit 25.

The differential amplifier circuit 23 and the differential amplifier circuit 24 each perform a difference calculation between an input signal to the positive-side input terminal and an input signal to the negative-side input terminal. The differential amplifier circuit 23 and the differential amplifier circuit 24 then output, to the control circuit 25, output signals according to the intensity of signals received by the first electrode conductors $12Y_1$ to $12Y_m$ and the second electrode conductors $13X_1$ to $13X_n$, respectively, with noise entering the first electrode conductors $12Y_1$ to $12Y_m$ and the second electrode conductors $13X_1$ to $13X_n$ being cancelled. In this embodiment, although not shown in FIG. 1, the output signals of the differential amplifier circuit 23 and the differential amplifier circuit 24 are converted to a digital signal by an analog digital converter (ADC) to be supplied to the control circuit 25.

The control circuit 25 detects the position coordinate of the X-axis direction of a position indicated by the indicating pen 40 on the sensor 10 from the intensity of the output signal of the differential amplifier circuit 23 and the second electrode conductors selected by the selecting circuit 21 among the second electrode conductors $13X_1$ to $13X_n$. Furthermore, the control circuit 25 detects the position coordinate of the Y-axis direction of a position indicated by the indicating pen 40 on the sensor 10 from the intensity of the output signal of the differential amplifier circuit 24 and the first electrode conductors selected by the selecting circuit 22 among the first electrode conductors $12Y_1$ to $12Y_m$. In this manner, the control circuit 25 detects the coordinates of the position indicated by the indicating pen 40.

A position indicated by the indicating pen 40 may be roughly detected by all of the electrode conductors of the sensor 10 such that, by the selecting circuit 21 and the selecting circuit 22, plural electrode conductors are connected to each of the positive-side input terminals and the negative-side input terminals of the differential amplifier circuit 23 and the differential amplifier circuit 24. In this embodiment, after the rough position of the indicating pen 40 is detected, detailed detection of the position indicated by the indicating pen 40 is carried out by plural first electrode conductors and second electrode conductors near the detected position. In the detailed detection of the indicated position, the selecting circuit 21 and the selecting circuit 22 are controlled by the control circuit 25 to select one each electrode conductor to be connected to the positive-side input terminals and the negative-side input terminals of the differential amplifier circuit 23 and the differential amplifier circuit 24.

[Configuration Example of Sensor 10]

Figure 2:
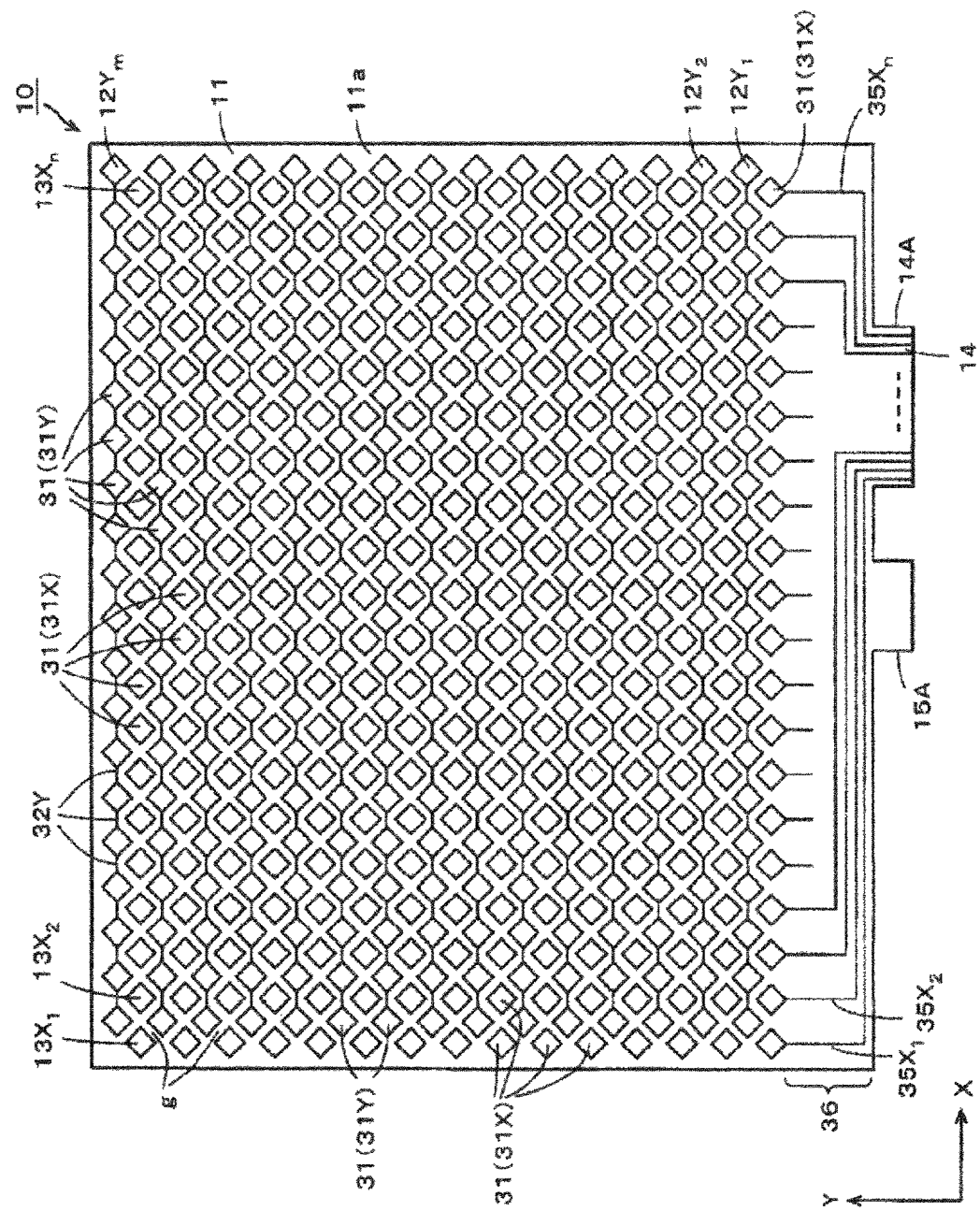
FIG. 2 is a diagram of one example of a sensor used for a position detecting device according to a first embodiment of the invention, as viewed from the front surface side of a substrate.

Next, the configuration of the conductor patterns including the first electrode conductor group 12, the second electrode conductor group 13, and the line-concentrated parts 14 and 15 formed in the sensor 10 will be described with reference to FIGS. 2 to 4. FIG. 2 shows a detailed configuration example of the conductor patterns on the side of the front surface 11a of the substrate 11 of the sensor 10.

Figure 3:
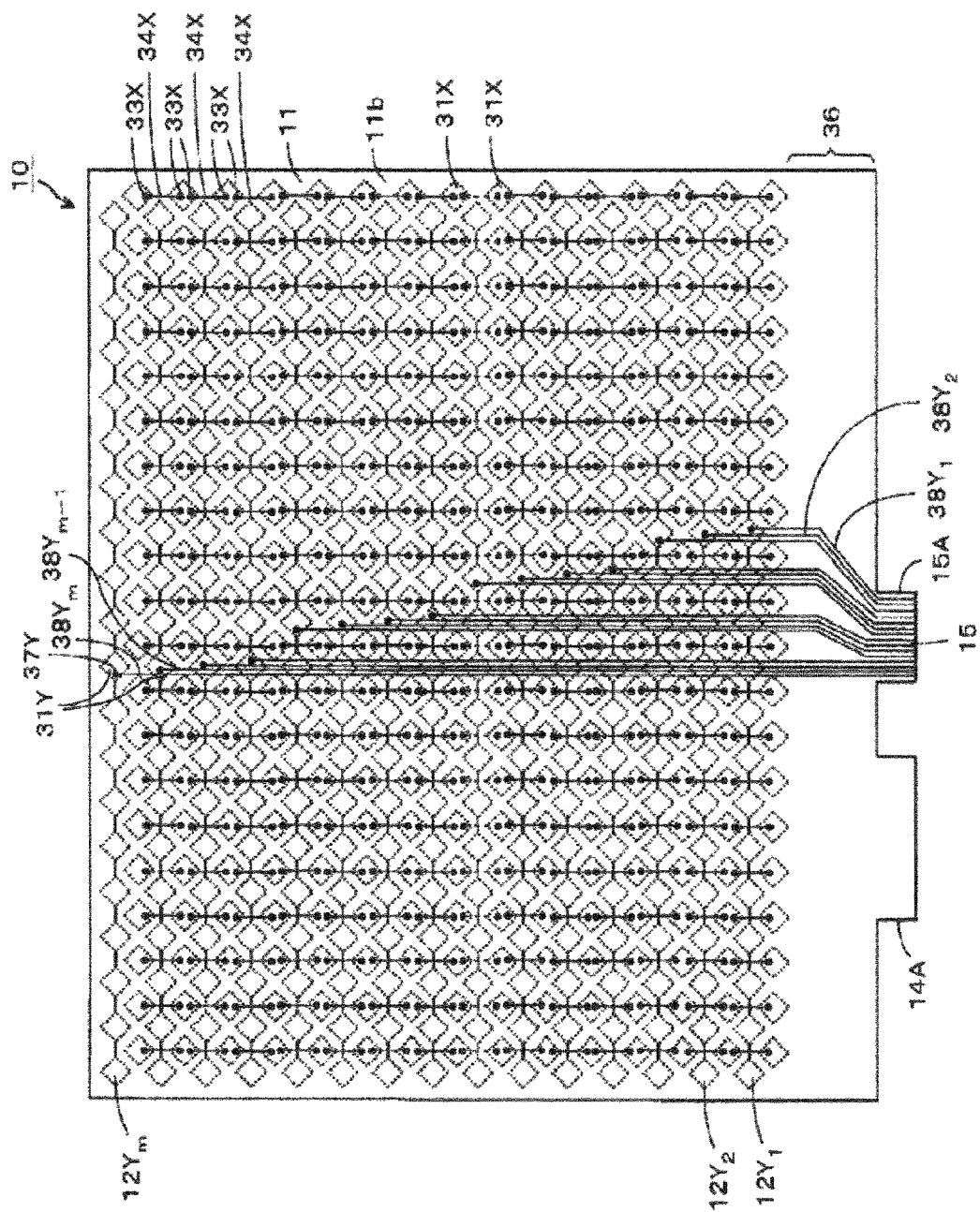
FIG. 3 is a diagram of one example of the sensor used for the position detecting device according to the first embodiment of the invention, as viewed from the back surface side of the substrate.

FIG. 3 shows a detailed configuration example of the conductor patterns on the side of the back surface 11b of the substrate 11 of the sensor 10. FIG. 4 shows an enlarged view of part of the sensor 10 as viewed from the side of the front surface 11a of the substrate 11.

As shown in FIG. 2, on the front surface 11a of the substrate 11, plural conductor patterns (or conductor shapes) 31, each having, for example, a diamond shape or a square shape, are formed. The conductor patterns 31 are formed such that the direction of one of its two diagonals is parallel to the extension direction of the first electrode conductors $12Y_1$ to $12Y_m$ (i.e., the X-axis direction). Similarly, the conductor patterns 31 are formed such that the direction of the other diagonal is parallel to the extension direction of the second electrode conductors $13X_1$ to $13X_n$ (i.e., the Y-axis direction). The conductor patterns 31 formed in this manner are closely arranged in the vertical direction, the horizontal direction, and oblique directions on the front surface 11a of the substrate 11. A slight gap g is formed between the conductor patterns 31 that are adjacent to each other. The gap g is formed between the conductor patterns 31 adjacent to each other in the oblique direction and has a distance d (see FIG. 4) to ensure adjacent conductor patterns 31 are insulated from each other in the oblique direction.

As shown in FIG. 2, the plural conductor patterns 31 in each row lined along the X-axis direction are formed such that one of the diagonals thereof is disposed on one straight line along the X-axis direction. In addition, the conductor patterns 31 in each column lined along the Y-axis direction are formed such that the other of the diagonals thereof is disposed on one straight line along the Y-axis direction. By forming the plural conductor patterns 31 in this manner, plural rows of the plural conductor patterns 31, each lined on one straight line along the X-axis direction, are juxtaposed in the Y-axis direction on the front surface 11a of the substrate 11.

As shown in FIG. 2, first connecting parts 32Y (see FIG. 4) are formed between respective two conductor patterns of the plural conductor patterns 31 and are lined in a straight line toward the left end in the X-axis direction from a conductor pattern formed at the right end among the plural conductor patterns 31, on each row lined on a straight line along the X-axis direction. The first connecting parts 32Y electrically connect the conductor patterns 31 adjacent in the X-axis direction to each other, and extend along the X-axis direction on the front surface 11a of the substrate 11. The conductor patterns 31 adjacent in the X-axis direction are electrically connected to each other by the first connecting parts 32Y to form the first electrode conductors $12Y_1$ to $12Y_m$ shown in FIG. 1. Hereinafter, the conductor patterns 31 configuring the first electrode conductors $12Y_1$ to $12Y_m$ will be referred to as the conductor patterns 31Y. The conductor patterns 31Y and the first connecting parts 32Y are monolithically formed as printed patterns.

For the plural conductor patterns 31 other than the plural conductor patterns 31Y configuring the first electrode conductors $12Y_1$ to $12Y_m$ (hereinafter, referred to as the conductor patterns 31X), the conductor patterns 31X, which are in a straight line along the Y-axis direction, are electrically connected to each other, as described below, to form the second electrode conductors $13X_1$ to $13X_n$.

Figure 4:
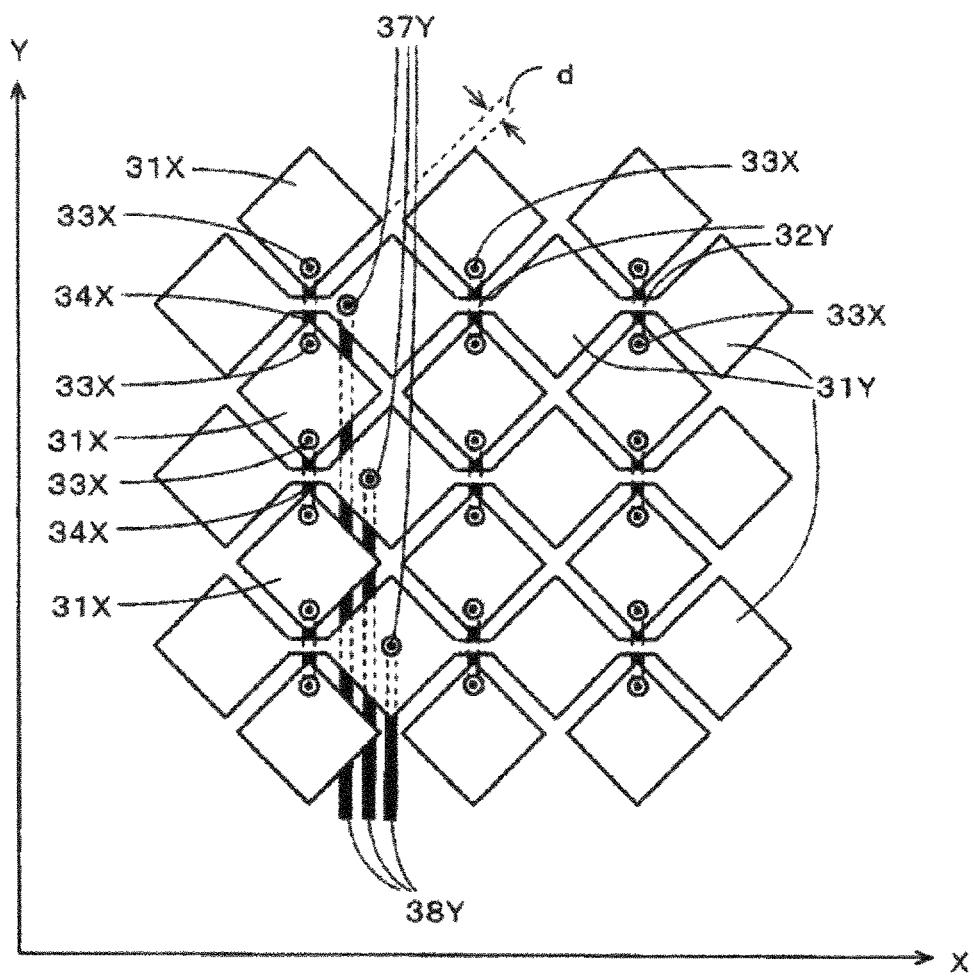
FIG. 4 is a partial enlarged view of one example of the sensor used for the position detecting device according to the first embodiment of the invention, as viewed from the front surface side of the substrate.

As shown in FIGS. 3 and 4, plural through-holes 33X are formed in the substrate 11. The through-holes 33X are provided to overlap with the conductor patterns 31X and to electrically connect (via second connecting parts 34X to be described later) the conductor patterns 31X adjacent in the Y-axis direction to each other. One through-hole is made for each of the conductor patterns 31X disposed at both ends of the substrate 11 in the Y-axis direction and two through-holes are made for each of the other conductor patterns 31X. The through-holes 33X are arranged to form a line along the Y-axis direction. Plural such lines (or columns) of the plural through-holes 33X are juxtaposed in the X-axis direction. The side of the through-hole 33X on the front surface 11a is electrically connected to the conductor pattern 31X on which this through-hole 33X overlaps.

Furthermore, as shown in FIGS. 3 and 4, on the side of the back surface 11b of the substrate 11, plural second connecting parts 34X that electrically connect the conductor patterns 31X adjacent in the Y-axis direction to each other are provided. The second connecting parts 34X are formed to extend along the Y-axis direction and electrically connect two through-holes 33X that are close to each other among the through-holes 33X overlapping with two conductor patterns 31X adjacent to each other. In this manner, the conductor patterns 31X adjacent in the Y-axis direction are electrically connected to each other by the plural through-holes 33X and the plural second connecting parts 34X and form the second electrode conductors $13X_1$ to $13X_n$ extending along the Y-axis direction (see FIGS. 2 and 3).

Moreover, as shown in FIG. 2, plural connecting lines $35X_1$ to $35X_n$ are formed on the front surface 11a of the substrate 11. One end of each of the plural connecting lines $35X_1$ to $35X_n$ is electrically connected to the conductor pattern 31X formed at the lower end in the Y-axis direction among the conductor patterns 31X configuring a corresponding one of the second electrode conductors $13X_1$ to $13X_n$, and the other end is formed to be led to the line-concentrated part 14 formed at the projecting part 14A of the substrate 11. The plural connecting lines $35X_1$ to $35X_n$ are formed in an interconnect area 36 provided on the lower end side of the substrate 11 in the Y-axis direction and are formed to be routed along the periphery of the substrate 11 and led to the line-concentrated part 14.

On the other hand, as described below in reference to FIG. 3, connecting lines $38Y_1$ to $38Y_m$ for the first electrode conductors $12Y_1$ to $12Y_m$ are densely formed on the side of the back surface 11b of the substrate 11 by being disposed in parallel and close to each other in an area opposed to the conductor patterns 31 (31Y and 31X) closely arranged on the front surface 11a of the substrate 11.

Specifically, as shown in FIGS. 3 and 4, through-holes 37Y are formed in the substrate 11 in such a manner that each through-hole 37Y overlaps with one conductor pattern 31Y among the plural conductor patterns 31Y configuring a respective one of the first electrode conductors $12Y_1$ to $12Y_m$. The through-holes 37Y connect the connecting lines $38Y_1$ to $38Y_m$ to the corresponding first electrode conductors $12Y_1$ to $12Y_m$, respectively. The side of the through-hole 37Y on the front surface 11a of the substrate 11 is electrically connected to the conductor pattern 31Y on which this through-hole 37Y overlaps. Furthermore, one end of each of the connecting lines $38Y_1$ to $38Y_m$ is electrically connected to the through-hole 37Y formed for the conductor pattern 31Y configuring a corresponding one of the first electrode conductors $12Y_1$ to $12Y_m$.

Because the second connecting parts 34X of the second electrode conductors $13X_1$ to $13X_n$ are provided on the back surface 11b of the substrate 11, the through-holes 37Y overlapping with the conductor patterns 31Y adjacent in the Y-axis direction are slightly offset from the second connecting parts 34X and from each other in the X-axis direction. The purpose of this is to shorten the lengths of the connecting lines $38Y_1$ to $38Y_m$ while preventing them from overlapping with the second connecting parts 34X.

As shown in FIG. 3, one end of each of the connecting lines $38Y_1$ to $38Y_m$ is electrically connected via the through-hole 37Y to the conductor pattern 31Y configuring a corresponding one of the first electrode conductors $12Y_1$ to $12Y_m$. Each of the connecting lines $38Y_1$ to $38Y_m$ is formed to linearly extend along the Y-axis direction at least in the area opposed to the conductor patterns 31. The other end of each of the connecting lines $38Y_1$ to $38Y_m$ is formed to be led to the line-concentrated part 15 of the projecting part 15A provided at the lower end of the substrate 11 in the Y-axis direction.

By setting the extension direction of the second connecting parts 34X parallel to the extension direction of the connecting lines $38Y_1$ to $38Y_m$ in this manner, the connecting lines $38Y_1$ to $38Y_m$ can be formed close to the second connecting parts 34X. Therefore, the distance between two electrode conductors connected to the non-inverting input terminal and the inverting input terminal of the differential amplifier circuit 23 can be shortened and enhancement in the noise resistance obtained by the differential amplification can be achieved. Moreover, because the distances among the connecting lines $38Y_1$ to $38Y_m$ can be set shorter, the lowering of the density of the connecting lines $38Y_1$ to $38Y_m$ can be minimized. The connecting lines $35X_1$ to $35X_n$ for the second electrode conductors $13X_1$ to $13X_n$ are formed in the interconnect area 36 on the side of the front surface 11a of the substrate 11.

Therefore, according to this embodiment, the interconnect area of the connecting lines can be smaller than in the related arts. Thus, the size of the substrate can be reduced, which can prevent the lowering of convenience and design property.

Furthermore, because the connecting lines $35X_1$ to $35X_n$ for the second electrode conductors $13X_1$ to $13X_n$ are formed in the interconnect area, a detection result of a position indicated by the indicating pen can be obtained with the same accuracy as that in the related arts regarding received signals from the second electrode conductors $13X_1$ to $13X_n$.

The connecting lines $38Y_1$ to $38Y_m$ for the first electrode conductors $12Y_1$ to $12Y_m$ are formed on the side of the back surface 11b of the substrate 11 to overlap with the conductor patterns 31 (31X and 31Y), which form the first electrode conductor group 12 and the second electrode conductor group 13 on the side of the front surface 11a of the substrate 11. Therefore, the influence of a jump of a transmitted signal from the indicating pen 40 to the connecting lines $38Y_1$ to $38Y_m$ is an issue.

However, the connecting lines $38Y_1$ to $38Y_m$ are electrostatically shielded by the plural conductor patterns 31 (31X and 31Y) provided on the front surface 11a of the substrate 11, and reception of a transmitted signal from the indicating pen 40 by the connecting lines $38Y_1$ to $38Y_m$ is prevented or alleviated. Furthermore, the connecting lines $38Y_1$ to $38Y_m$ are disposed close to each other. Therefore, even when a signal or noise is superimposed on these connecting lines $38Y_1$ to $38Y_m$, the signal or noise is superimposed on connecting lines adjacent to each other in a similar manner. This allows the signal or noise superimposed on the connecting lines $38Y_1$ to $38Y_m$ to be removed by performing a difference calculation on signals from plural electrode conductors in the differential amplifier circuit of the signal processing circuit.

Furthermore, the connecting lines $38Y_1$ to $38Y_m$ for the first electrode conductors $12Y_1$ to $12Y_m$ are formed on the side of the back surface 11b of the substrate 11 and extend along the Y-axis direction intersecting (orthogonal to) the X-axis direction, along which the first electrode conductors $12Y_1$ to $12Y_m$ extend. Thus, it is easy to form the connecting lines $38Y_1$ to $38Y_m$ in parallel and close to each other on the side of the back surface 11b of the substrate 11.

Moreover, for the second electrode conductors $13X_1$ to $13X_n$, whose extension direction is the direction along which the connecting lines $38Y_1$ to $38Y_m$ extend, the conductor patterns 31X are connected to each other by the second connecting parts 34X along the Y-axis direction via through-holes on the side of the back surface 11b of the substrate 11. Thus, the connecting lines $38Y_1$ to $38Y_m$ are parallel to the second connecting parts 34X. Therefore, even when the connecting lines $38Y_1$ to $38Y_m$ straddle the second connecting parts 34X, the distance between the connecting lines $38Y_1$ to $38Y_m$ straddling the second connecting parts 34X can be short and the lowering of the density of the connecting lines $38Y_1$ to $38Y_m$ can be suppressed to a minimum.

Second Embodiment

A second embodiment is a modification example of the first embodiment. A sensor 10B in the second embodiment is different from the sensor 10 in the first embodiment in the following points. Specifically, the respective conductor patterns 31X configuring the second electrode conductors $13X_1$ to $13X_n$ formed on the front surface 11a of the substrate 11 of the sensor 10B of the second embodiment are connected to each other on the front surface 11a of the substrate 11. Furthermore, the respective conductor patterns 31Y configuring the first electrode conductors $12Y_1$ to $12Y_m$ are connected to each other on the side of the back surface 11b of the substrate 11.

Figure 5:
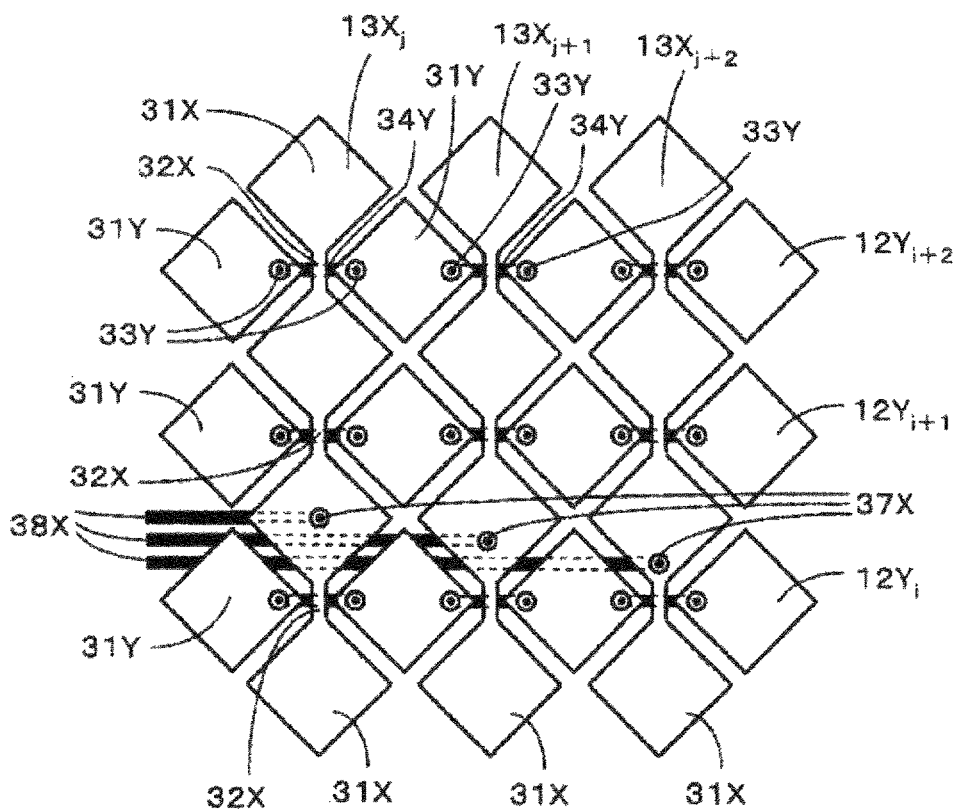
FIG. 5 is a partial enlarged view of one example of a sensor used for a position detecting device according to a second embodiment of the invention, as viewed from the front surface side of a substrate.
Figure 6:
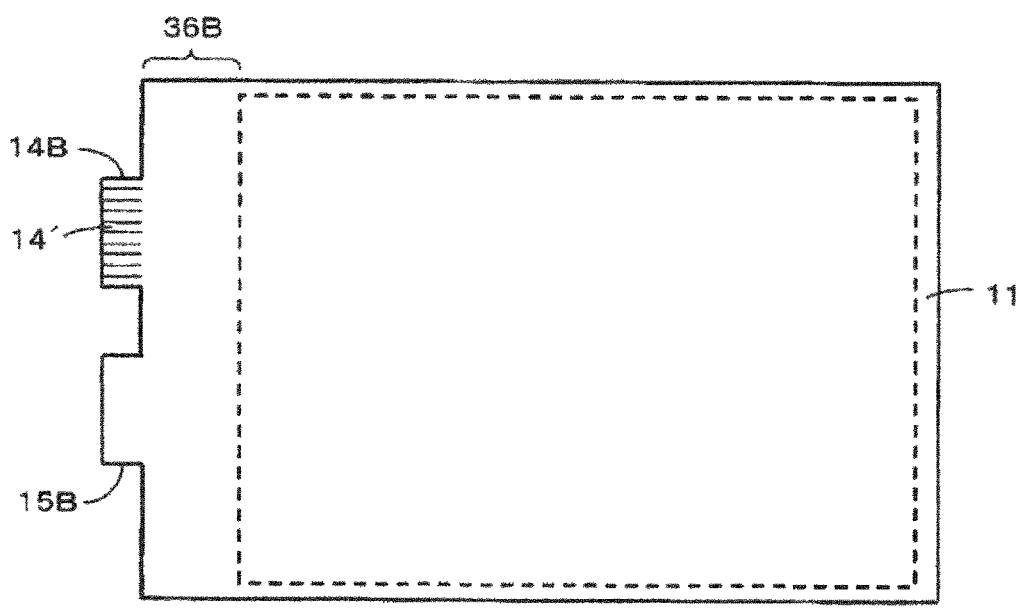
FIG. 6 is a diagram for explaining the shape of the substrate of one example of the sensor used for the position detecting device according to the second embodiment of the invention.

FIG. 5 is a diagram for explaining a configuration example of the major part of the sensor 10B of a position detecting device of the second embodiment. In FIG. 5, the same part as that in the first embodiment is given the same reference symbol. This FIG. 5 corresponds to FIG. 4 for the above-described first embodiment and shows an enlarged view of part of the sensor 10B as viewed from the side of the front surface 11a of the substrate 11 of the sensor 10B. FIG. 6 shows the positions of projecting parts 14B and 15B for line-concentrated parts provided in the substrate 11 of the sensor 10B in the case of the second embodiment.

In the second embodiment, third connecting parts 32X, which electrically connect the adjacent conductor patterns 31 to each other, are formed between respective two of the plural conductor patterns 31 that are lined on a straight line. Multiple such lines are formed and arranged from the upper end toward the lower end in the Y-axis direction, as viewed from the side of the front surface 11a of the substrate 11, among the plural conductor patterns 31 on each column lined on a straight line along the Y-axis direction. The third connecting parts 32X are formed to extend along the Y-axis direction on the front surface 11a of the substrate 11. The conductor patterns 31X adjacent in the Y-axis direction are electrically connected to each other by the third connecting parts 32X, so that the second electrode conductors $13X_1$ to $13X_n$ shown in FIG. 1 (in FIG. 5, $13X_j$, $13X_{j+1}$, and $13X_{j+2}$ are shown) are each formed. The conductor patterns 31X and the third connecting parts 32X are monolithically formed as printed patterns.

The plural conductor patterns 31Y, other than the plural conductor patterns 31X configuring the second electrode conductors $13X_1$ to $13X_n$, included in a straight line along the X-axis direction are electrically connected to each other as described below to form each of the first electrode conductors $12Y_1$ to $12Y_m$ (in FIGS. 5, $12Y_i$, $12Y_{i+1}$, and $12Y_{i+2}$).

Specifically, as shown in FIG. 5, through-holes 33Y are formed in the substrate 11. The through-holes 33Y overlap with the plural conductor patterns 31Y and electrically connect the conductor patterns 31Y adjacent in the X-axis direction to each other (via fourth connecting parts 34Y to be described later). In regards to the through-holes 33Y, as shown in FIG. 5, one through-hole is made for each of the conductor patterns 31Y that are disposed at both ends of the substrate 11 in the X-axis direction and two through-holes are made for each of the other conductor patterns 31Y. The through-holes 33Y are formed to make a line along the X-axis direction, and plural rows of the plural through-holes 33Y, each arranged on a line, are juxtaposed in the Y-axis direction. The side of the through-hole 33Y on the front surface 11a of the substrate 11 is electrically connected to the conductor pattern 31Y, on which this through-hole 33Y overlaps.

As shown in FIG. 5, on the back surface of the substrate 11, fourth connecting parts 34Y for electrically connecting the conductor patterns 31Y adjacent in the X-axis direction to each other are formed. The fourth connecting part 34Y is formed to extend along the X-axis direction and electrically connect two through-holes 33Y close to each other among the through-holes 33Y overlapping with two conductor patterns 31Y adjacent to each other. The conductor patterns 31Y adjacent in the X-axis direction are electrically connected to each other by the plural through-holes 33Y and the plural fourth connecting parts 34Y to form the first electrode conductors $12Y_1$ to $12Y_m$ extending along the X-axis direction (see $12Y_i$, $12Y_{i+1}$, and $12Y_{i+2}$ in FIG. 5).

As shown in FIG. 6, on the left end side of the substrate 11, as viewed from the front surface side, the projecting parts 14B and 15B for line-concentrated parts 14' and 15' are formed similar to the first embodiment. Although not shown in FIG. 6, on the front surface of the substrate 11, plural connecting lines are formed to be led from the conductor patterns 31Y at the left end among the conductor patterns 31Y configuring the first electrode conductors $12Y_1$ to $12Y_m$ to the line-concentrated part 14' formed at the projecting part 14B of the substrate 11. These plural connecting lines are formed in an interconnect area 36B provided on the front surface of the substrate 11 and on the left end side in the X-axis direction.

On the other hand, as shown in FIG. 5, connecting lines 38X for the second electrode conductors $13X_1$ to $13X_n$ are densely formed on the back surface side of the substrate 11 by being disposed in parallel and close to each other in an area opposed to the conductor patterns 31 (31Y and 31X) closely arranged on the front surface 11a of the substrate 11, similar to the first embodiment.

Specifically, as shown in FIG. 5, through-holes 37X for connecting the plural connecting lines 38X to the corresponding second electrode conductors $13X_1$ to $13X_n$ are formed in the substrate 11 such that each through-hole 37X overlaps with one conductor pattern 31X among the plural conductor patterns 31X configuring a respective one of the second electrode conductors $13X_1$ to $13X_n$. The side of the through-hole 37X on the front surface side of the substrate 11 is electrically connected to the conductor pattern 31X on which the through-hole 37X overlaps. One end of each of the plural connecting lines 38X corresponding to the second electrode conductors $13X_1$ to $13X_n$ is electrically connected to the through-hole 37X formed for the conductor pattern 31X configuring a corresponding one of the second electrode conductors 13X$_1$ to 13X$_n$.

Furthermore, as shown in FIG. 5, each of the connecting lines 38X is formed to linearly extend along the X-axis direction on the back surface side of the substrate 11. The other ends of the connecting lines 38X are formed to be each led to the line-concentrated part 15' of the projecting part 15B provided at the left end of the substrate 11 in the X-axis direction. The through-holes 37X of the conductor patterns 31X are formed such that the parts linearly extending along the X-axis direction for the plural connecting lines 38X are disposed in parallel and close to each other.

Also in the second embodiment, because the fourth connecting parts 34Y are provided on the back surface of the substrate 11, the through-holes 37X overlapping with the conductor patterns 31X adjacent in the X-axis direction are slightly offset from the fourth connection parts 34Y and from each other in the Y-axis direction. The purpose of this is to shorten the lengths of the connecting lines 38X while preventing them from overlapping with the fourth connecting parts 34Y.

One end of each of the connecting lines 38X is electrically connected to a corresponding one of the second electrode conductors 13X$_1$ to 13X$_n$ via the through-hole 37X. Each connecting line 38X is formed to linearly extend along the X-axis direction at least in the area opposed to the conductor patterns 31. The other end of each of the connecting lines 38X is formed to be led to the line-concentrated part 15' of the projecting part 15B provided at the left end of the substrate 11 in the X-axis direction.

In this case, whereas the extension direction of the second electrode conductors 13X$_1$ to 13X$_n$ is the Y-axis direction, the extension direction of each of the plural connecting lines 38X is the X-axis direction. This allows the parts linearly extending along the X-axis direction in the connecting lines 38X to be disposed in parallel and close to each other.

As above, in the second embodiment, the connecting lines 38X can be formed close to the fourth connecting parts 34Y because the extension direction of the fourth connecting parts 34Y is parallel to the extension direction of the connecting lines 38X. Therefore, the distance between two electrode conductors connected to the non-inverting input terminal and the inverting input terminal of the differential amplifier circuit 23 can be shortened and enhancement in the noise resistance obtained by the differential amplification can be achieved. Moreover, because the distances among the connecting lines 38X can be set shorter, the lowering of the density of the connecting lines 38X can be minimized.

Furthermore, in the second embodiment, only the connecting of the conductor patterns 31 (31Y and 31X) regarding the first electrode conductors 12Y$_1$ to 12Y$_m$ and the second electrode conductors 13X$_1$ to 13X$_n$, and the lead-out direction of the connecting lines are different from the first embodiment as described above. The same operation and effect as those of the above-described first embodiment are achieved.

Third Embodiment

In the above-described first and second embodiments, the cases in which the connecting lines of either one of the first electrode conductors 12Y$_1$ to 12Y$_m$ and the second electrode conductors 13X$_1$ to 13X$_n$ are formed on the back surface of the substrate 11 are exemplified. However, the connecting lines of both the first electrode conductors 12Y$_1$ to 12Y$_m$ and the second electrode conductors 13X$_1$ to 13X$_n$ may be formed on the back surface of the substrate 11 and be made opposed to the conductor patterns 31 (31Y and 31X) configuring the first electrode conductors 12Y$_1$ to 12Y$_m$ and the second electrode conductors 13X$_1$ to 13X$_n$. A third embodiment is an example of this case.

FIGS. 7A and 7B are diagrams for explaining an outline of a sensor 10D of the third embodiment.

As shown in FIG. 7A, the sensor 10D in the third embodiment includes a first substrate 11D and a second substrate 11E, and has a structure obtained by attaching the first substrate 11D and the second substrate 11E to each other.

In the first substrate 11D, instead of the through-holes 37X in the second embodiment, vias 37XD that penetrate both the first and second substrates 11D and 11E when the first and second substrates 11D and 11E are attached to each other are formed. Furthermore, in the first substrate 11D, similar to the through-holes 33Y in the second embodiment, vias 33YB for electrically connecting the conductor patterns 31Y adjacent in the X-axis direction to each other (via the fourth connecting parts 34Y) on a back surface 11Db of the first substrate 11D are formed. The vias 37XD and the vias 33YB are formed at the same positions where the through-holes 37X and 33Y in the second embodiment are formed.

As shown in FIG. 7B, plural third connecting parts 32X extended along the Y-axis direction are provided on a front surface 11Da of the first substrate 11D. The conductor patterns 31X adjacent in the Y-axis direction are connected to each other by the third connecting parts 32X to form each of the second electrode conductors 13X$_1$ to 13X$_n$ (in FIG. 7B, 13X$_j$, 13X$_{j+1}$, and 13X$_{j+2}$ are shown). Furthermore, plural fourth connecting parts 34Y extended along the X-axis direction are formed on the back surface 11Db of the first substrate 11D. The fourth connecting part 34Y is formed between the conductor patterns 31Y adjacent in the X-axis direction. Both ends of the fourth connecting part 34Y are electrically connected to the vias 33YB each formed for a respective one of the conductor patterns 31Y adjacent in the X-axis direction. In this manner, the conductor patterns 31Y formed adjacent in the X-axis direction are electrically connected through the vias 33YB and the fourth connecting parts 34Y to form each of the first electrode conductors 12Y$_1$ to 12Y$_m$ (see 12Y$_i$, 12Y$_{i+1}$, and 12Y$_{i+2}$ in FIG. 7B).

In the second substrate 11E, the vias 37XD and plural connecting lines 38XD (on a back surface 11Eb of the second substrate 11E, as described later) and 38YD (on a front surface 11Ea of the second substrate 11E, as described later) are formed. As shown in FIG. 7A, a front surface 11Ea of this second substrate 11E is attached to the back surface 11Db of the first substrate 11D. The fourth connecting parts 34Y are provided between the front surface 11Ea of the second substrate 11E and the back surface 11Db of the first substrate 11D.

As shown in FIG. 7B, one end of each of the plural connecting lines 38XD is connected to a respective one of the conductor patterns 31X arranged in the X-axis direction among the conductor patterns 31X configuring the second electrode conductors 13X$_1$ to 13X$_n$ by the vias 37XD made between the front surface 11Da of the first substrate 11D and the back surface 11Eb of the second substrate 11E. As shown in FIG. 7B, the plural connecting lines 38XD extend along the X-axis direction and are densely formed in parallel and close to each other. The plural connecting lines 38XD are provided on the back surface 11Eb of the second substrate 11E. Thus, the density thereof can be set high because other conductor lines that should be avoided do not exist.

Furthermore, as shown in FIG. 7B, one end of each of the plural connecting lines 38YD is connected to a respective one of the conductor patterns 31Y arranged in the Y-axis direction among the conductor patterns 31Y configuring the first electrode conductors $12Y_1$ to $12Y_m$ by vias 37YD penetrating the first substrate 11D. The connecting lines 38YD extend between the back surface 11Db of the first substrate 11D and the front surface 11Ea of the second substrate 11E.

In this case, the plural connecting lines 38YD extend along the X-axis direction in parallel with each other as shown in FIG. 7B. The plural connecting lines 38YD are provided on the back surface 11Db of the first substrate 11D.

Modification Examples of Shape of Conductor Pattern 31

First Example

In the above-described embodiments, the cases in which the conductor patterns 31 (31X and 31Y) are formed into a diamond shape, particularly a square shape, are exemplified. However, the shape of the conductor patterns 31 (31X and 31Y) may be any shape as long as the first electrode conductors $12Y_1$ to $12Y_m$ are the same as the second electrode conductors $13X_1$ to $13X_n$ in the detection sensitivity of the indicator and the shape allows the whole of the front surface 11a of the substrate 11 to be covered as much as possible.

Figure 8A:
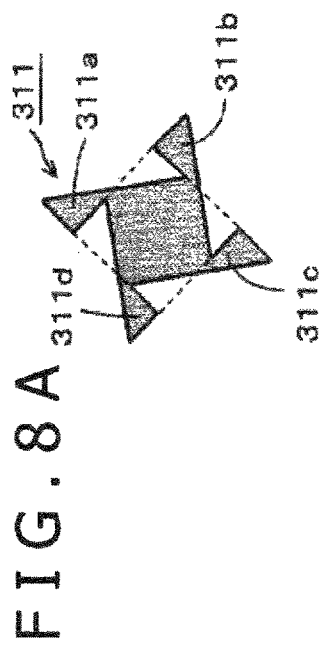
FIGS. 8A to 8D are diagrams for explaining another example of a conductor pattern of the sensor used for the position detecting devices according to the embodiments of the invention.
Figure 8C:
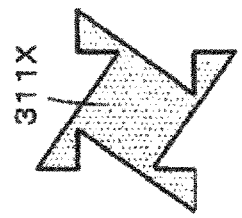
Figure 8D:
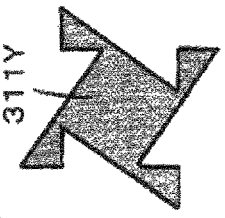

FIGS. 8A to 8D are diagrams showing a first example of another shape of the conductor pattern 31. In the first example, only the shape of the sensor is different from the sensor 10 in the above-described first embodiment. Specifically, as shown in FIG. 8A, a conductor pattern 311 of the first example is obtained by transforming the conductor pattern 31 having the square shape in the above-described embodiments into a shape having four protruding parts 311a, 311b, 311c, and 311d. The other configurations are the same as that of the first embodiment and therefore detailed description thereof is omitted.

Figure 8B:
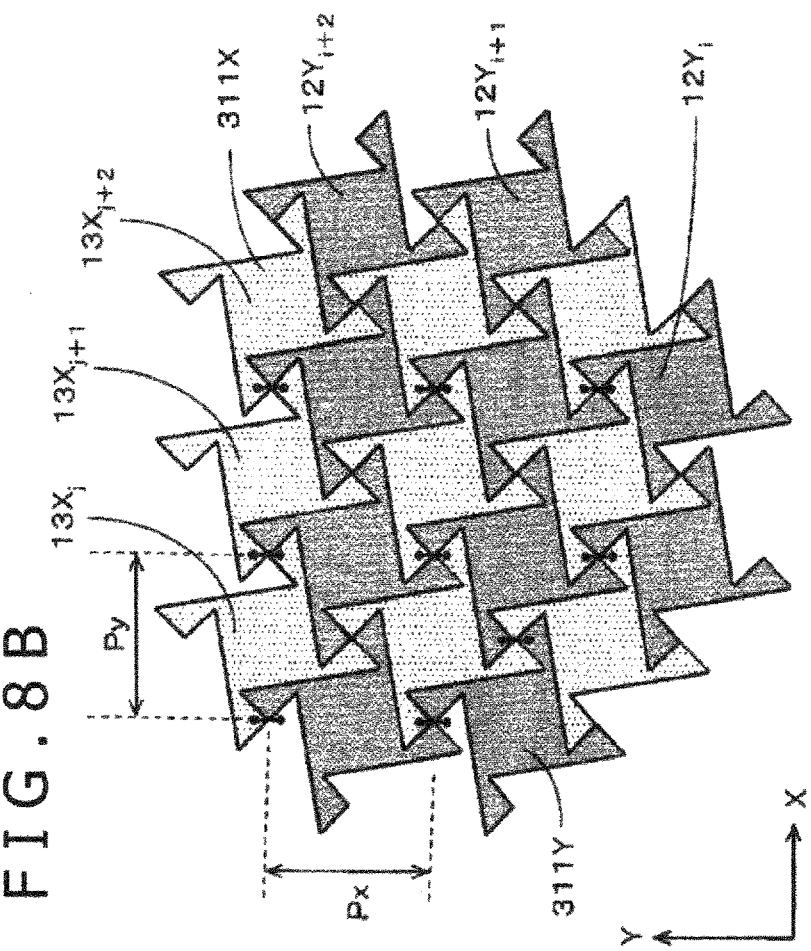

The first electrode conductors $12Y_1$ to $12Y_m$ ($12Y_i$, $12Y_{i+1}$, and $12Y_{i+2}$ are shown in FIG. 8B) and the second electrode conductors $13X_1$ to $13X_n$ ($13X_j$, $13X_{j+1}$, and $13X_{j+2}$ are shown in FIG. 8B) in the first example are composed of plural conductor patterns 311Y (see FIG. 8D) and conductor patterns 311X (see FIG. 8C), respectively. Furthermore, as shown in FIG. 8B, the conductor patterns 311Y configuring each of the first electrode conductors $12Y_1$ to $12Y_m$ arranged along the X-axis direction and the conductor patterns 311X configuring each of the second electrode conductors $13X_1$ to $13X_n$ arranged along the Y-axis direction are configured to partially enter each other's conductor pattern areas and are interlaced with each other by using each other's protruding parts 311a, 311b, 311c, and 311d.

In the case of the conductor patterns 311 (311Y and 311X) shown in the first example, the adjacent conductor patterns 311 (311Y and 311X) partially enter each other's conductor pattern areas and are interlaced with each other as shown in FIG. 8B. Therefore, the second highest signal level increases at the electrode conductor that receives a signal from an indicating pen, which can enhance the detection sensitivity of the indicating pen. Accordingly, as shown in FIG. 8B, forming pitches Py and Px of the first electrode conductors $12Y_1$ to $12Y_m$ and the second electrode conductors $13X_1$ to $13X_n$, respectively, can be set larger than related arts, so that the number of multiplexers to switch the first electrode conductors $12Y_1$ to $12Y_m$ and the second electrode conductors $13X_1$ to $13X_n$ can be reduced.

Second Example

Figure 9A:
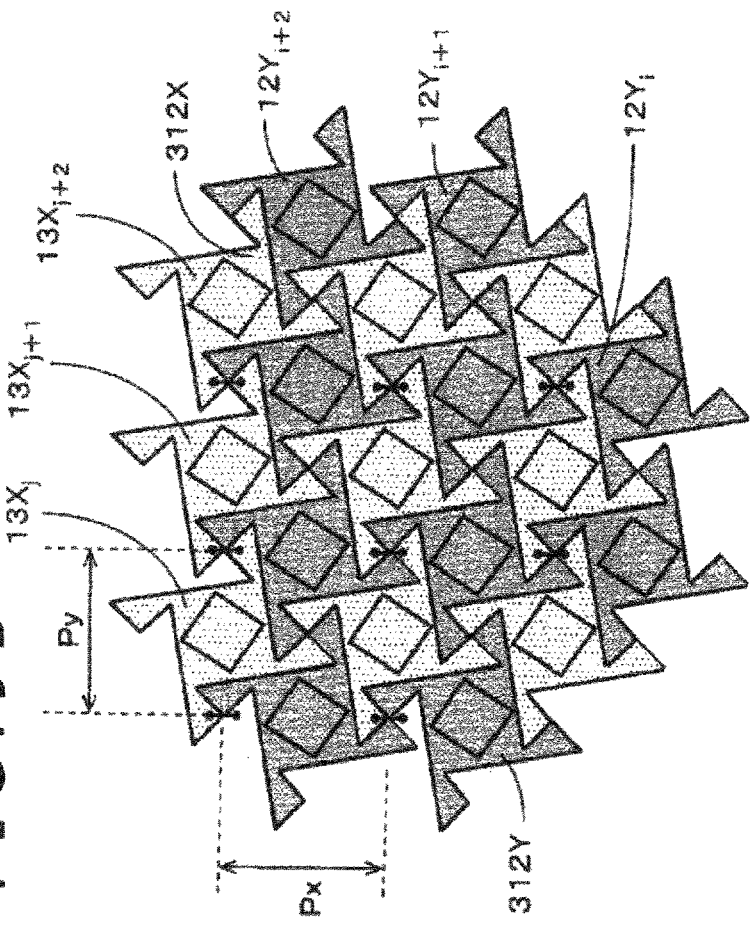
FIGS. 9A to 9D are diagrams for explaining another example of the conductor pattern of the sensor used for the position detecting devices according to the embodiments of the invention.

FIGS. 9A to 9D show a second example of a modification of the conductor pattern 31. The second example is an example of the conductor pattern obtained by transforming the conductor pattern of the first example. The same part as that in the first example is given the same symbol. As shown in FIG. 9A, in a conductor pattern 312 of the second example, a square part 312e that is electrically non-connected (in a floating state) is formed at the center part having the protruding parts 311a, 311b, 311c, and 311d. The other configurations are the same as that of the conductor pattern 311 shown in the first example.

Figure 9B:
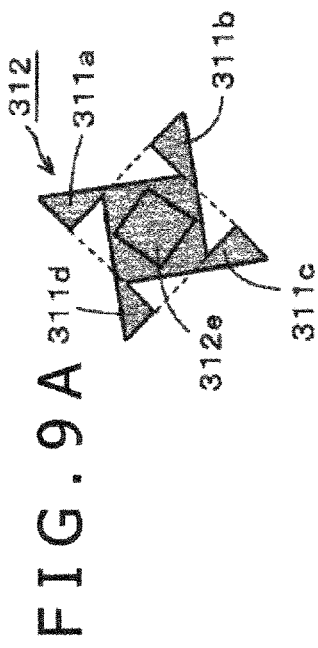
Figure 9C:
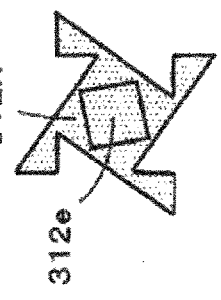
Figure 9D:
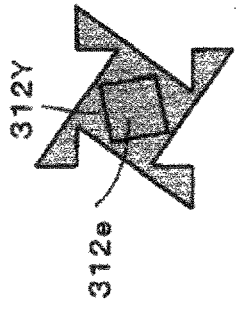

The first electrode conductors $12Y_1$ to $12Y_m$ ($12Y_i$, $12Y_{i+1}$, and $12Y_{i+2}$ are shown in FIG. 9B) and the second electrode conductors $13X_1$ to $13X_n$ ($13X_j$, $13X_{j+1}$, and $13X_{j+2}$ are shown in FIG. 9B) in the second example are composed of plural conductor patterns 312Y (see FIG. 9D) and conductor patterns 312X (see FIG. 9C), respectively. Furthermore, similar to the first electrode conductors $12Y_1$ to $12Y_m$ and the second electrode conductors $13X_1$ to $13X_n$ in the first example, the conductor patterns 312Y configuring each of the first electrode conductors $12Y_1$ to $12Y_m$ arranged along the X-axis direction and the conductor patterns 312X configuring each of the second electrode conductors $13X_1$ to $13X_n$ arranged along the Y-axis direction are configured to partially enter each other's conductor pattern areas and are interlaced with each other by using each other's protruding parts 311a, 311b, 311c, and 311d.

According to the second example, the square part 312e formed in the electrically floating state does not contribute to reception of a transmitted signal from an indicating pen. Therefore, the second highest signal level further increases at the electrode conductor that receives a signal from the indicating pen 40 (see FIG. 1), which can further enhance the detection sensitivity.

Third Example

Figure 10A:
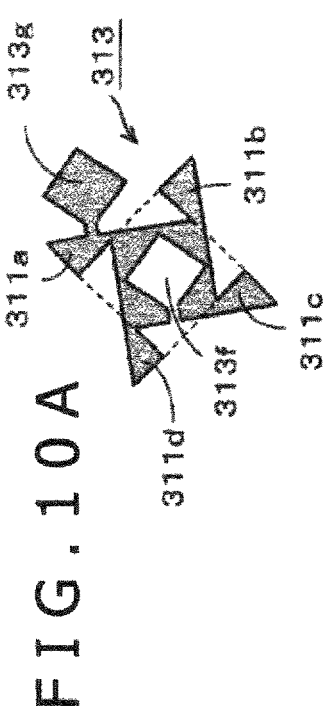
FIGS. 10A to 10D are diagrams for explaining another example of the conductor pattern of the sensor used for the position detecting devices according to the embodiments of the invention.
Figure 10B:
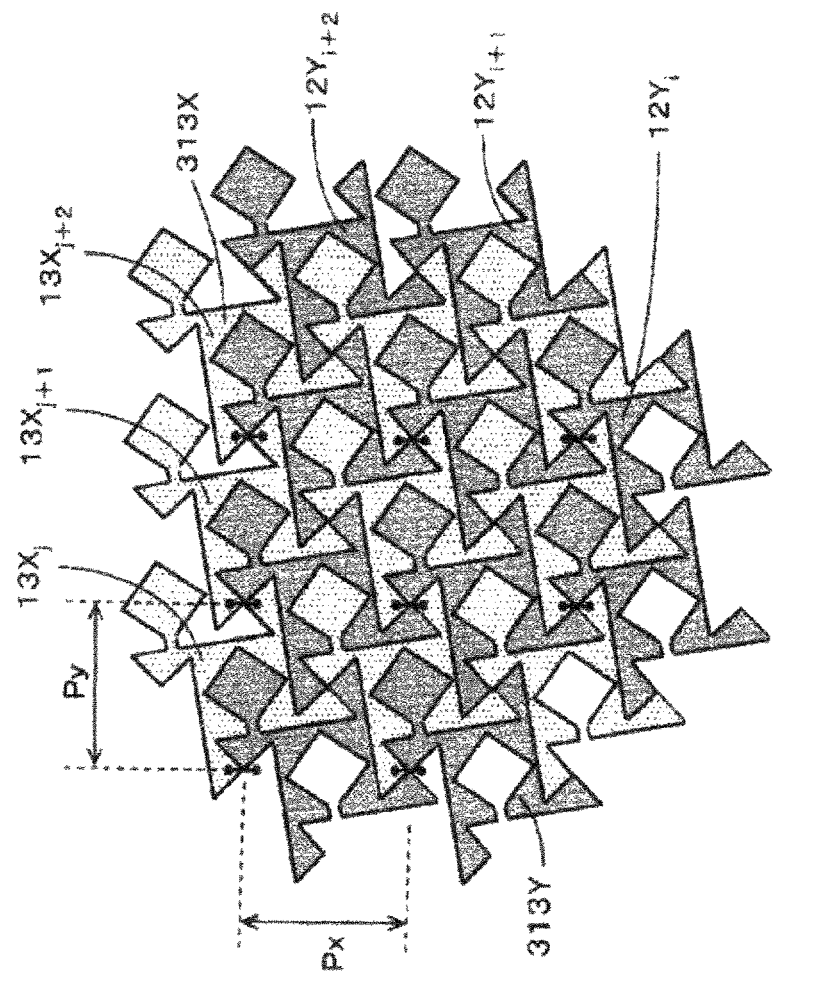
Figure 10C:
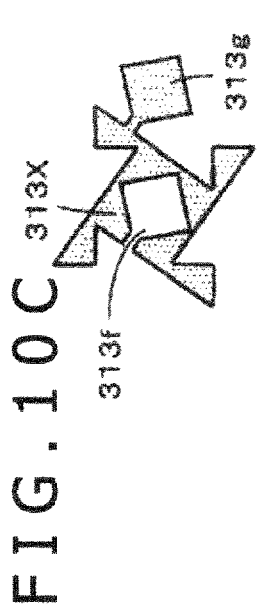
Figure 10D:
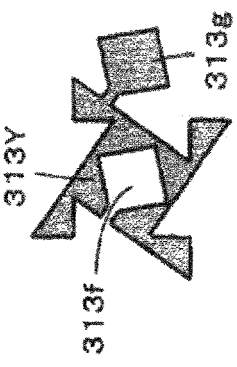
Figure 11:
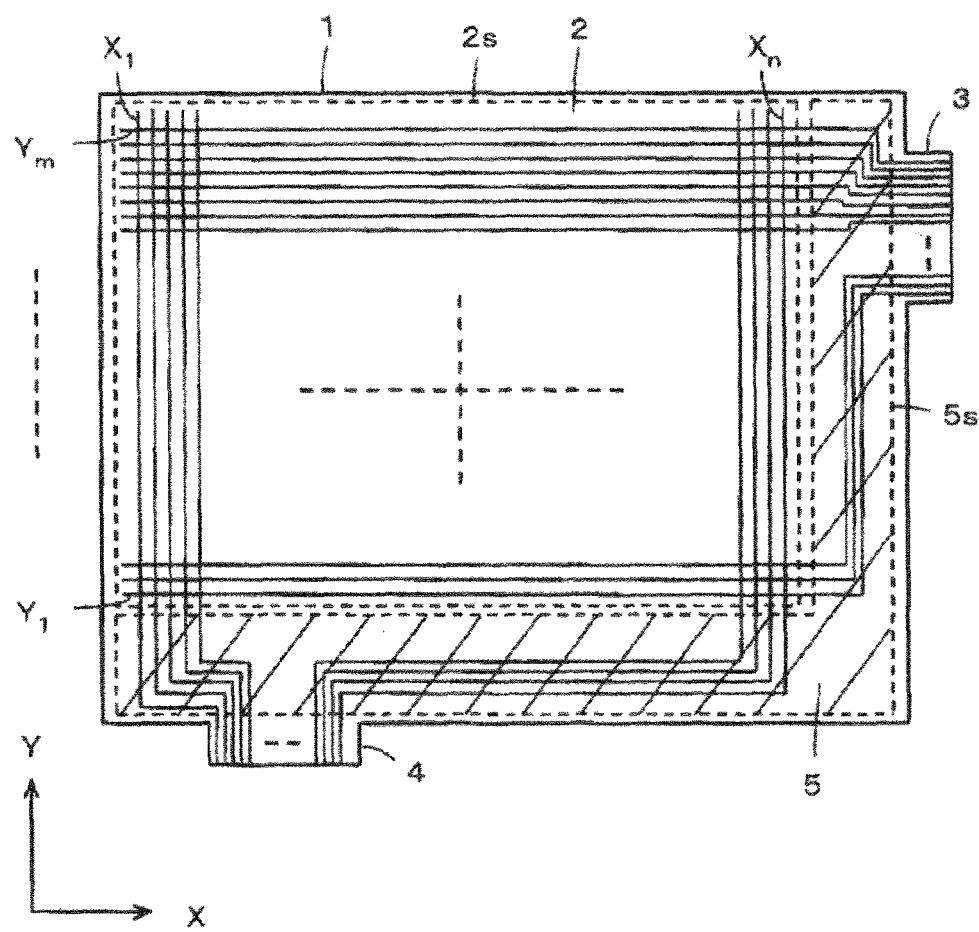
FIG. 11 is a diagram for explaining a position detecting device of a related art.

FIGS. 10A to 10D show a third example of a modification of the conductor pattern 31. The third example is an example of the conductor pattern obtained by transforming the conductor pattern of the second example. The same part as that in the second example is given the same symbol. As shown in FIG. 10A, in a conductor pattern 313 of the third example, an area 313f in which the conductor pattern does not exist is formed at the part corresponding to the square part 312e in the conductor pattern 312 of the second example. Furthermore, beside the protruding part 311a of the conductor pattern 313, a square part 313g corresponding to the area 313f is formed to protrude toward the adjacent conductor pattern 313. The square part 313g is formed in the area 313f formed in the adjacent conductor pattern 313 in an electrically floating state with respect to the adjacent conductor pattern 313. The other configurations are the same as that of the second example.

According to the third example, because the square part 313g is formed to enter the adjacent conductor pattern 313, the detection sensitivity of the indicating pen can be enhanced similar to the conductor patterns 311 and 312 in the first and second examples, respectively.

Other Embodiments or Modification Examples

The above embodiments are described by exemplifying the cases of application thereof to a sensor of a system to detect a position indicated by the indicating pen 40 based on change in the capacitance at the intersections of the first electrode conductors extending along the X-axis direction and the second electrode conductors extending along the Y-axis direction. However, it is also possible to apply the invention to a sensor in which electrode conductors are arranged along only one of the X-axis direction and the Y-axis direction.

By forming the conductor patterns to configure the first electrode conductors and the second electrode conductors by a transparent electrode conductor, such as indium tin oxide (ITO), the sensor of the position detecting device of the invention can be superimposed on a display device such as a liquid crystal display. It is obvious that the conductor patterns to configure the first electrode conductors and the second electrode conductors do not need to be formed by a transparent conductor if the sensor is not superimposed on a display device, such as a liquid crystal display.

It is to be noted that the embodiment of the present disclosure is not limited to the foregoing embodiments, and that various changes can be made without departing from the spirit of the present disclosure.

The invention claimed is:

1. A position detecting device of a capacitive system that detects a position indicated by an indicator based on a signal transmitted from the indicator, the position detecting device comprising:
a substrate having a first surface and a second surface opposed to the first surface;
a plurality of first elongated electrode conductors that extend along a first direction and are disposed in parallel to each other, wherein the first elongated electrode conductor is formed of conductor patterns that are disposed on the first surface of the substrate along the first direction and are electrically coupled to each other by first connecting parts, which are disposed on the second surface of the substrate and are coupled to the conductor patterns through vias formed in the substrate;
a plurality of second elongated electrode conductors that extend along a second direction, which intersects the first direction, and are disposed in parallel to each other, wherein the second elongated electrode conductor is formed of conductor patterns that are disposed on the first surface of the substrate along the second direction and are electrically coupled to each other by second connecting parts disposed on the first surface of the substrate;
a plurality of second connecting lines that are led out from the plurality of second elongated electrode conductors through vias formed in the substrate to extend on the second surface of the substrate along a third direction that is substantially parallel to the first direction; and
a signal processing circuit including a differential amplifier circuit which, in operation, calculates and outputs a difference between signals received by at least two elongated electrode conductors selected from the plurality of second elongated electrode conductors, wherein the signal processing circuit, in operation, detects the position indicated by the indicator based on the difference output by the differential amplifier circuit.

2. The position detecting device according to claim 1, wherein the third direction is in parallel to the first direction.

3. The position detecting device according to claim 1, wherein the conductor patterns forming the plurality of first elongated electrode conductors do not overlap with the conductor patterns forming the plurality of second elongated electrode conductors in a direction orthogonal to the first and second surfaces of the substrate.

4. The position detecting device according to claim 1, wherein the plurality of first elongated electrode conductors are in parallel to the plurality of second connecting lines.

5. The position detecting device according to claim 1, wherein the substrate includes a tab projecting in the third direction.

6. The position detecting device according to claim 5, wherein some or all of the plurality of second connecting lines are disposed on the tab.

7. The position detecting device according to claim 1, wherein each of the conductor patterns has a diamond shape.

8. The position detecting device according to claim 1, wherein the conductor patterns forming the plurality of first elongated electrode conductors are interlaced with the conductor patterns forming the plurality of second elongated electrode conductors in a mesh pattern.

9. The position detecting device according to claim 1, further comprising:
a plurality of first connecting lines that are led out from the plurality of first elongated electrode conductors to extend along the third direction;
wherein the differential amplifier, in operation, calculates and outputs a difference between signals received by at least two elongated electrode conductors selected from the plurality of first elongated electrode conductors and the plurality of second elongated electrode conductors.

10. The position detecting device according to claim 9, wherein the substrate is formed of a first substrate and a second substrate that are insulated from each other, the first substrate providing the first surface and including a first tab projecting in the third direction, and the second substrate providing the second surface and including a second tab projecting in the third direction, the plurality of first connecting lines are disposed on the first tab, and
the plurality of second connecting lines are disposed on the second tab.

11. The position detecting device according to claim 9, wherein the signal processing circuit is formed of first and second differential amplifier circuits, wherein the first and second differential amplifier circuits, in operation, calculate a difference between signals from at least two elongated electrode conductors selected from the plurality of first elongated electrode conductors and the plurality of second elongated electrode conductors, respectively.

12. The position detecting device according to claim 9, wherein the plurality of first connecting lines are disposed on the first surface of the substrate.

13. The position detecting device according to claim 9, wherein the substrate includes a tab projecting in the third direction and including first and second portions, and the plurality of first connecting lines are disposed on the first portion of the tab and the plurality of second connecting lines are disposed on the second portion of the tab.

14. The position detecting device according to claim 1, wherein the second direction is orthogonal to the first direction.

15. The position detecting device according to claim 1, wherein two or more of the second connecting lines are disposed in parallel to each other within a width of the conductor pattern along the second direction.

16. A position detecting device of a capacitive system that detects a position indicated by an indicator based on a signal transmitted from the indicator, the position detecting device comprising:
- a substrate having a first surface and a second surface opposed to the first surface;
- a plurality of first elongated electrode conductors that extend along a first direction and are disposed in parallel to each other, wherein the first elongated electrode conductor is formed of conductor patterns that are disposed on the first surface of the substrate along the first direction and are electrically coupled to each other by first connecting parts, which are disposed on the second surface of the substrate and are coupled to the conductor patterns through vias formed in the substrate;
- a plurality of second elongated electrode conductors that extend along a second direction, which intersects the first direction, and are disposed in parallel to each other, wherein the second elongated electrode conductor is formed of conductor patterns that are disposed on the first surface of the substrate along the second direction and are electrically coupled to each other by second connecting parts disposed on the first surface of the substrate;
- a plurality of second connecting lines that are led out from the plurality of second elongated electrode conductors through vias formed in the substrate to extend on the second surface of the substrate along a third direction that is substantially parallel to the first direction; and
- a signal processing circuit configured to detect the position indicated by the indicator based on signals provided by the plurality of second connecting lines.

17. The position detecting device according to claim 16, further comprising:
- a plurality of first connecting lines that are led out from the plurality of first elongated electrode conductors to extend along the third direction.

18. The position detecting device according to claim 17, wherein the plurality of first connecting lines are disposed on the first surface of the substrate.

\* \* \* \* \*